June 12, 1923.
R. REED
SHOCK ABSORBING DEVICE
Filed Oct. 9, 1922
1,458,149
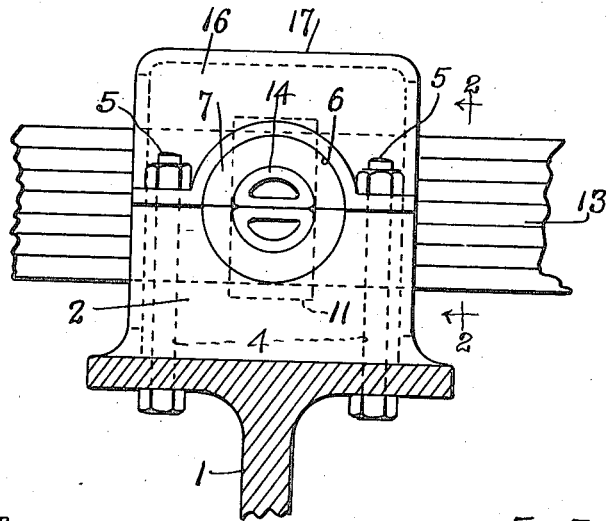
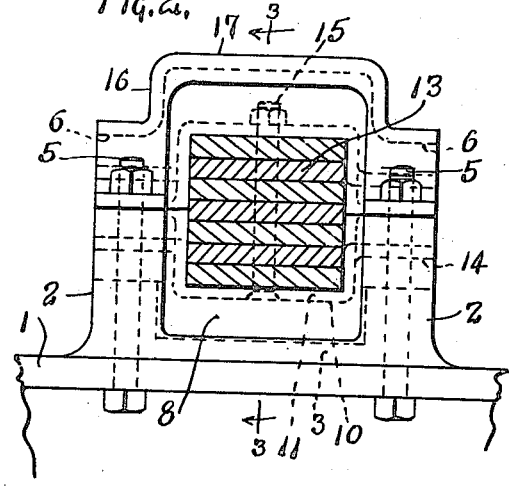 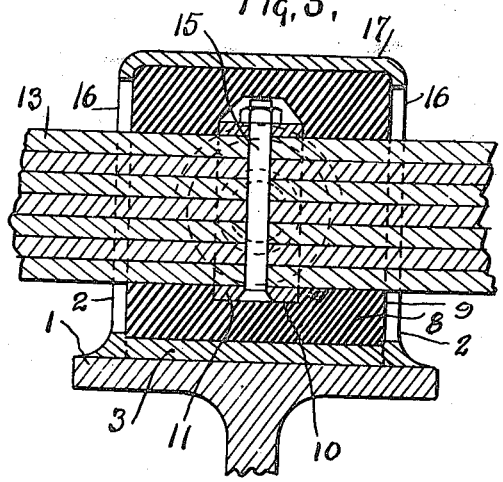
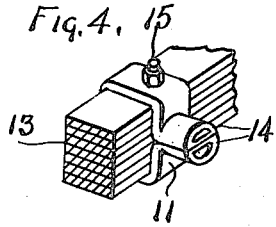 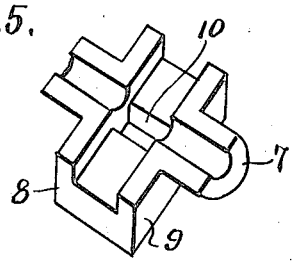
Inventor
RALPH REED,
By Toulmin & Toulmin
Attorney Patented June 12, 1923.

1,458,149

UNITED STATES PATENT OFFICE.

RALPH REED, OF CINCINNATI, OHIO.

SHOCK-ABSORBING DEVICE.

Application filed October 9, 1922. Serial No. 593,207.

*To all whom it may concern:*

Be it known that I, RALPH REED, a citizen of the United States, residing at Cincinnati, in the county of Hamilton and State of Ohio, have invented certain new and useful Improvements in Shock-Absorbing Devices, of which the following is a specification, reference being had therein to the accompanying drawing.

My invention relates to shock absorbing devices and in particular to a shock absorbing device and mounting therefor on an axle to support a spring.

It is the object of my invention to provide a shock absorbing, resilient mounting for the leaf spring of a vehicle, and in particular an automotive vehicle.

It is a further object of my invention to provide such a supporting and retaining means which will not interfere with the operation of the spring, which may be readily assembled and disassembled for inspection and repair, and which will positively hold the leaves of the spring together at their point of attachment.

It is a further object of my invention to provide for the rocking and minor movements of the spring on the axle.

It is one of the primary objects of my invention to provide a resilient medium which will be interposed in the line of shock and vibration in such a way that there will be no metal to metal contact, and that therefore the shock or vibrations will have to pass through substances of different rates of vibration, thus dampening the shock.

It is my object to provide a construction having a few readily attached parts which may be renewed when desired.

Referring to the drawings:

Figure 1 is a side elevation of the complete assembly showing the axle in section.

Figure 2 is a section on the line 2—2 of Figure 1, showing the casing in elevation.

Figure 3 is a section on the line 3—3 of Figure 2.

Figure 4 is a perspective showing the strap and trunnions.

Figure 5 is a perspective of the inside of one half of the resilient medium.

As to the details of the drawings:

1 is an axle upon which is mounted a U-shaped member composed of the side walls 2 and the bottom 3. The side walls 2 have apertures therethrough designated 4 for the reception of the bolts 5.

These bolts are connected with the axle in the customary manner.

The side walls 2 have semi-circular openings 6 for the reception of the halves of the tubular portion 7 of the resilient block, which is located within the U-shaped bottom member or half of the casing. This U-shaped member or half of the casing. This U-shaped block of rubber or the like, which may be either solely of rubber or a combination of rubber and fabric, is composed of a bottom member 8 and side walls 9. The bottom member 8 has on its upper surface a depression or cut-away portion 10 for the reception of the strap 11 which binds the spring leaves together.

Adjacent the cut-away portions 10 are the ends of the semi-circular members 7 which are located substantially at right angles to the major axis of the resilient U-shaped member.

The spring leaves are designated 13 and are embraced by the strap 11 which has a semi-circular projection 14 on either half thereof, which when united together, form a tubular member or trunnion. Such a trunnion may be formed in any desired fashion, but I have indicated one of my preferred forms. The spring leaves are prevented from forward shifting within the strap 11 by the bolt 15. This bolt may be countersunk in the strap when desired in order that smooth surfaces will be presented to the rubber cap shown in Figure 5. The resilient base and the resilient cap are identical and are interchangeable. The two resilient members embrace the spring and the trunnions, and thus interpose a resilient medium between the spring and its support so that there is no metal to metal contact.

A cap member having side walls 16 and a top 17 is provided for engagement with the bottom member. The bolts 5 serve to retain the cap and bottom portion of the casing in engagement with the cap and bottom resilient members and with the spring and axle. This forms a rigid combination of parts. All lateral and vertical movements are resiliently accommodated and all of the vibrations which are destructive to the machinery and body of the vehicle, and which are of such a character that the heavy leaf springs will not absorb them are dampened or absorbed by these resilient blocks illustrated in Figure 5. Instead of providing a rigid connection between the spring and the axle, this resilient and rocking connection is provided, which is of particular value on the front axle when the body has a tendency to plunge when the vehicle is passing over a rough road, thus relieving the strain on the spring joints, shackles and shackle bolts.

On the rear axle this arrangement is also of advantage to take up the sudden strains due not only to the movement of the vehicle on the road, but also to braking, and to the sudden application of power to the rear wheels.

The means by which the spring can be readily detached from the axle without allowing the leaves to become separated and the means of readily substituting new rubber blocks as easily as new tires are replaced, means to provide a construction which will prevent not only the vibrations being imparted to the vehicle, but also will prevent the wear and tear upon the parts which support, resiliently or otherwise, the body on the axles.

It will be understood that I desire to comprehend within my invention the necessary modifications thereof in adapting it to varying types of vehicles and to various purposes.

Having thus fully described my invention, what I claim as new and desire to secure by Letters Patent, is:—

1. In combination, an axle, a supporting housing, a leaf spring passed therethrough and a resilient medium embracing said leaf spring and interposed between it and the housing.

2. In combination, an axle, a supporting housing, a leaf spring passed therethrough, a resilient medium embracing said leaf spring and interposed between it and the housing, and means carried by the spring for supporting said spring in the resilient medium.

3. In combination, an axle, a casing mounted on said axle and retained thereto having an upper and a lower half, a resilient medium within said casing and a leaf spring supported by said medium, said leaf spring carrying trunnions to provide bearing surfaces for engaging with a portion of the resilient medium.

4. In combination, an axle, a hollow casing having upper and lower halves attached to said axle, a leaf spring passing through said halves, a resilient medium interposed between said leaf spring and said halves, having lateral projections inserted in portions of the casing to receive said projections, a strap engaging said leaf spring to retain the several leaves in engagement with one another and lateral bearings connected thereto for engagement with laterally projected portions of the resilient medium whereby said spring and strap are resiliently supported by said medium in said casing.

5. In combination, an axle, a hollow casing having upper and lower halves attached to said axle, a leaf spring passing through said halves, a resilient medium interposed between said leaf spring and said halves, having lateral projections inserted in portions of the casing to receive said projections, a strap engaging said leaf spring to retain the several leaves in engagement with one another, lateral bearings connected thereto for engagement with the laterally projected portions of the resilient medium and means carried by said strap engaging with the several leaves of the spring to prevent the shifting of the leaves, one upon another.

6. In combination, an axle, a casing composed of a U-shaped cap and a U-shaped bottom, bolts projected through said casing and axle, and locking the several parts to one another, tubular apertures formed in the side walls of said casing, a resilient bottom member and cap member located within the halves of said casing, having tubular projections extending into the tubular apertures in said casing, a leaf spring supported between the halves of the resilient members, and a strap retaining the leaves of said leaf spring to one another, said strap having tubular lateral projections to form bearings adapted to be inserted into the tubular resilient portions of the resilient members.

7. In combination, an axle, a casing composed of a U-shaped cap and a U-shaped bottom, bolts projected through said casing and axle, and locking the several parts to one another, tubular apertures formed in the side walls of said casing, a resilient bottom member and cap member located within the halves of said casing, having tubular projections extending into the tubular apertures in said casing, a leaf spring supported between the halves of the resilient members, and a strap retaining the leaves of said leaf spring to one another, said strap having tubular lateral projections to form bearings adapted to be inserted into the tubular resilient portions of the resilient members, the interior of said resilient members being cut-away to accommodate the strap.

8. In a new article of manufacture, a spring retaining and supporting member consisting of a strap arranged in halves, the ends of said strap being projected laterally to form supporting bearings.

9. In a new article of manufacture for a spring support consisting of a U-shaped resilient member, having semi-circular lateral projections with hollow interiors for the reception of spring supporting members.

10. In a new article of manufacture for a spring support consisting of a U-shaped resilient member, having semi-circular lateral projections with hollow interiors for the reception of spring supporting members, and a cut-away portion within said U-shaped resilient member for accommodating a strap on the spring to be supported thereby.

In testimony whereof, I affix my signature.

RALPH REED.